Jan. 29, 1935. H. WEIGAND 1,989,436
MILK BOTTLE SUSPENSION DEVICE
Filed Jan. 11, 1934
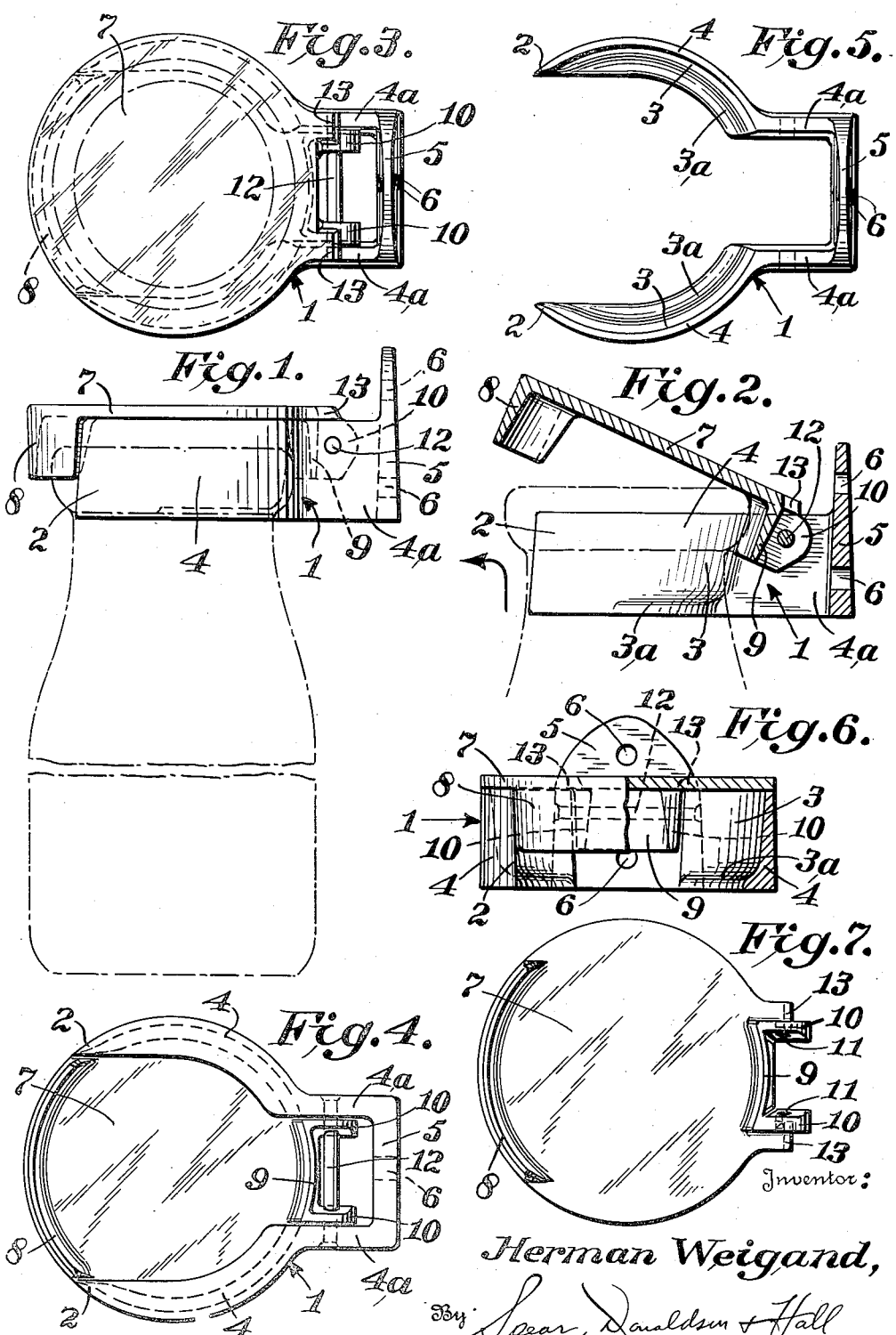
Inventor:
Herman Weigand,
By Spear, Donaldson & Hall
Attorneys Patented Jan. 29, 1935

1,989,436

UNITED STATES PATENT OFFICE 1,989,436

MILK BOTTLE SUSPENSION DEVICE

Herman Weigand, Leavenworth, Kans.

Application January 11, 1934, Serial No. 706,288

4 Claims. (Cl. 248—65)

My present invention relates to a milk or cream bottle suspension device and has for its object the provision of a simple device for suspending milk or cream bottles in a readily accessible position above the ground, floor, or steps, so that there can be no contamination thereof in any way, as by dirt or by animals, such as dogs and cats, or by flies, and no danger of breakage.

The invention consists in the features, combination and arrangement of parts hereinafter described and particularly pointed out in the claims.

In the drawing,

Figure 1 is a side elevation of my milk bottle holder in closed position with the bottle shown in dotted lines therein.

Fig. 2 is a sectional view of my device shown in open position with the bottle shown in dotted lines in position to be withdrawn therefrom or inserted therein.

Fig. 3 is a top plan view of Fig. 1.

Fig. 4 is a bottom plan view of the device.

Fig. 5 is a top plan view of the bracket with the cover removed.

Fig. 6 is a front elevation of the device partly in section.

Fig. 7 is a bottom plan view of the lid or cover.

Referring to the drawing, 1 represents the bracket, having an opening between its ends 2 of a size to receive the small portion of the neck of a cream or milk bottle. The wall of the bracket 1 is formed inwardly of its ends to provide a recess indicated generally by numeral 3 to receive and conform to the rim, lip, or bead of the mouth of the bottle, when the bottle is inserted with its small neck portion passing laterally through the open end of the bracket and then moved down into the recess 3 in the bracket. This formed recess 3 provides a rounded or beveled seat 3a conforming to the shape of the bottle lip, which seat is not continued to the ends of the bracket, thereby securely retaining the bottle against accidental displacement.

The bracket 1 comprises the arms 4 terminating in ends 2 and joined to base plate 5, which is provided with openings 6 to receive screws or the like for fastening the device to a window frame, door frame, house, post, or any other convenient object. The arms 4 are curved to conform to the curvature of the bottle with parallel straight portions 4a joining the curved portions with the back plate 5.

A lid or cover 7 is provided having a lip 8 extending downwardly from the front edge thereof and a lip 9 extending downwardly from the rear edge thereof, both of said lips conforming to the lateral curvature of the milk bottle mouth or top. When the lid 7 is in closed position the downwardly disposed laterally curved front and rear lips or flanges 8 and 9, together with the curved portions of arms 4, form a completely closed protecting cover for the mouth of the milk bottle, fitting and conforming to its curvature, and preventing contamination thereof, as by flies, dust, or otherwise.

Extending rearwardly from the side edges of the rear flange 9 are a pair of ears 10 having holes 11 to receive a pin 12 secured to and extending between the parallel portions 4a of the arms 4 of the bracket, so that the lid or cover is pivoted on said pin. The ears 10 of rear flange 9 are disposed between the straight portions 4a and the flat top portion of the lid is extended laterally beyond the ears, providing stop shoulders 13 which will engage the top of the parallel portions 4a of the bracket to limit the upward swing of the lid or cover 7. The stop shoulders 13 are so positioned with respect to the pivot 12 that the cover is stopped in its upswing before it reaches a perpendicular position, so that it will always tend to close by its own weight.

The bracket 1, comprising the arms 4 and back plate 5 may be molded or stamped in one piece. It is to be noted that the bracket is of considerable depth to completely cover and protect the top part of the bottle, although the front flange 8 of the lid or cover is of somewhat less depth than the bracket. The greater the depth of the flange 8, the higher will the lid have to be lifted in inserting or removing the bottle, so that the flange 8 need only be deep enough to cover the bottle rim to the desired extent to protect it against contamination. When, as shown, the bracket wall is somewhat deeper than the front flange 8 of the lid, the end edges 2 of the bracket serve as guiding surfaces, the bottle being readily placed against the exposed end edges 2 and raised in sliding contact therewith to lift the lid.

In the operation of the device, the milk or cream bottle is engaged beneath the front flange 8 of the lid or cover, and is then raised to lift the cover and is inserted laterally beneath the cover with the small portion of the bottle neck passing through the opening between the ends of the bracket, and is then moved down until the bead of the bottle is seated in the recess in the bracket. Removal is easily effected, it being only necessary to move the bottle upward and forward to take it from the holder. When the bottle in the holder device is lifted, its rim engages the lid near the pivot and lifts the lid and raises the front flange above the rim, so that the bottle is readily slipped out by the upward and forward movement.

The device prevents dogs or cats from licking the bottles to get the milk or cream that often is present on the top of the bottle, especially in warm weather. It also so completely covers the bottle, when the device is closed, as to prevent access of flies or the like to the bottle mouth or rim. It is not necessary for the housewife to stoop to pick up the milk when delivered, as the device may be secured in any suitable elevated position. All that is necessary is to take hold of the bottle, raise it upward and forward, and the bottle is free in the hand. The device provides a safe, sanitary place to put the empty bottle after the milk or cream has been used. It may be used for keeping the milk or cream in a cool place during the cooler months of the year. The bottle is safe from breakage either when empty or full, if kept in the bracket.

I claim:

1. A device for suspending and protecting milk bottles or the like, comprising a bracket of general U-shape having a base plate and a pair of arms extending from said base plate, said arms extending straight and parallel from their juncture with the base plate and at a midpoint extending outwardly and then inwardly in arc-shape and providing an opening between them, said arms having downwardly converging opposite inner surfaces providing a recess and support for a milk bottle or the like, a lid having a downwardly disposed arc-shaped front flange to close the opening between the ends of the bracket arms, and a downwardly disposed arc-shaped rear flange to close the opening between the arc-shaped portion of the arms at said midpoint to provide a complete conforming enclosure for the top of the milk bottle disposed in the recess between the arms, ears extending rearwardly from said rear flange into the space between the parallel portions of said arms, said ears having openings therein, a pin extending transversely between the parallel portions of the arms and through the openings in the ears to provide a pivotal connection for the lid, and stop shoulders on said lid extending laterally beyond the ears and so disposed in relation to the pivot as to engage the top edges of the parallel portions of the arms to limit the opening of the lid to less than 90° so that it will always tend to close by its own weight.

2. In a suspending and protecting device for milk bottles or the like, a bracket comprising a base plate and a pair of arms extending from said base plate to receive and support the milk bottle, a lid pivotally mounted to rest on said arms, and having stop shoulders to engage said arms, said stop shoulders being so disposed in relation to said pivot as to engage said arms and limit the opening of the lid to within 90°, so that it will always tend to close of its own weight.

3. A device according to claim 2 in which the arms of the bracket are of substantial depth and are thicker at the bottom than toward the top to provide a recess and support for the rim or bead of the milk bottle, said lid having front and rear downwardly disposed flanges which together with the arms provide a complete enclosure for the milk bottle top.

4. A device according to claim 2 in which the lid is provided at its front edge with a downwardly disposed flange to extend between the ends of the arms, said flange being of less depth than the depth of the arms and leaving a portion of the ends of the arms exposed to contact with and guide the bottle in applying the bottle thereto to lift the lid for insertion.

HERMAN WEIGAND.